(12) United States Patent
Ryan

(10) Patent No.: US 6,535,137 B1
(45) Date of Patent: Mar. 18, 2003

(54) CHILD SEAT ALARM

(76) Inventor: Janet Lee Ryan, 515 Knoll St., Wheaton, IL (US) 60187

( * ) Notice: Subject to any disclaimer, the term of this patent is extended or adjusted under 35 U.S.C. 154(b) by 39 days.

(21) Appl. No.: 09/961,963

(22) Filed: Sep. 24, 2001

(51) Int. Cl.$^7$ .............................................. G08B 23/00
(52) U.S. Cl. .................... 340/687; 340/457; 340/573.1; 340/667
(58) Field of Search ............................. 340/573.1, 457, 340/667, 687

(56) References Cited

U.S. PATENT DOCUMENTS

| | | | | |
|---|---|---|---|---|
| 5,793,291 A | * | 8/1998 | Thornton | 340/573.1 |
| 5,949,340 A | * | 9/1999 | Rossi | 340/573.1 |
| 6,104,293 A | * | 8/2000 | Rossi | 340/573.1 |
| 6,250,672 B1 | * | 6/2001 | Ryan et al. | 280/735 |
| 6,264,236 B1 | * | 7/2001 | Aoki | 280/735 |
| 6,351,210 B1 | * | 2/2002 | Stewart | 340/457.1 |

* cited by examiner

Primary Examiner—Daniel J. Wu
(74) Attorney, Agent, or Firm—Goldstein & Lavas, P.C.

(57) ABSTRACT

A child seat alarm including a car seat portion adapted for being positioned within a motor vehicle. The car seat portion includes child engagement straps. The child engagement straps include a male buckle and a corresponding female receptacle. The male buckle is lockably received within the female receptacle in a locked orientation. An alarm is disposed within the car seat portion. The alarm includes a pair of speakers for broadcasting an audible alarm. The alarm is in an activated orientation when the male buckle is lockably received within the female receptacle. The alarm is in a deactivated orientation when the male buckle is removed from the female receptacle. The alarm is in communication with an electrical system of the vehicle whereby a shut down of the motor vehicle's engine or an opening of a driver's door will sound the alarm when the alarm is in the activated orientation.

3 Claims, 3 Drawing Sheets

CHILD SEAT ALARM

BACKGROUND OF THE INVENTION

The present invention relates to a child seat alarm and more particularly pertains to preventing a child from being left inside a motor vehicle once a door of the vehicle has been opened or its engine has been shut off.

The use of alerting devices is known in the prior art. More specifically, alerting devices heretofore devised and utilized for the purpose of sensing occupants of vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,260,684 to Metzmaker discloses a child warning system for use with a vehicle's car seat that is capable of providing alerts for such situations as the seat is improperly mounted or restraint is improperly buckled. U.S. Pat. No. 6,029,105 to Schweizer discloses means for monitoring the occupancy of space in a vehicle to determine use of seatbelts and air bags. U.S. Pat. No. 6,026,340 to Corrado discloses means for sensing the occupancy of passengers and a child seat in a vehicle for use in controlling air bags.

While these devices fulfill their respective, particular objective and requirements, the aforementioned patents do not describe a child seat alarm for preventing a child from being left inside a motor vehicle once a door of the vehicle has been opened or its engine has been shut off.

In this respect, the child seat alarm according to the present invention substantially departs from the conventional concepts and designs of the prior art, and in doing so provides an apparatus primarily developed for the purpose of preventing a child from being left inside a motor vehicle once a door of the vehicle has been opened or its engine has been shut off.

Therefore, it can be appreciated that there exists a continuing need for a new and improved child seat alarm which can be used for preventing a child from being left inside a motor vehicle once a door of the vehicle has been opened or its engine has been shut off. In this regard, the present invention substantially fulfills this need.

SUMMARY OF THE INVENTION

In the view of the foregoing disadvantages inherent in the known types of alerting devices now present in the prior art, the present invention provides an improved child seat alarm. As such, the general purpose of the present invention, which will be described subsequently in greater detail, is to provide a new and improved child seat alarm which has all the advantages of the prior art and none of the disadvantages.

To attain this, the present invention essentially comprises a car seat portion adapted for being positioned within a motor vehicle. The car seat portion includes child engagement straps. The child engagement straps include a male buckle and a corresponding female receptacle. The male buckle is lockably received within the female receptacle in a locked orientation. An alarm is disposed within the car seat portion. The alarm includes a pair of speakers for broadcasting an audible alarm. The alarm is in an activated orientation when the male buckle is lockably received within the female receptacle. The alarm is in a deactivated orientation when the male buckle is removed from the female receptacle. The alarm is in communication with an electrical system of the vehicle whereby a shut down of the motor vehicle's engine or an opening of a driver's door will sound the alarm when the alarm is in the activated orientation. A display is adapted for mounting on a dashboard of the motor vehicle. The display is in communication with the alarm. The display includes a plurality of suction cups disposed on a lower surface thereof to facilitate mounting to the dashboard.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child seat alarm which has all the advantages of the prior art alerting devices and none of the disadvantages.

It is another object of the present invention to provide a new and improved child seat alarm which may be easily and efficiently manufactured and marketed.

It is a further object of the present invention to provide a new and improved child seat alarm which is of durable and reliable construction.

An even further object of the present invention is to provide a new and improved child seat alarm which is susceptible of a low cost of manufacture with regard to both materials and labor, and which accordingly is then susceptible of low prices of sale to the consuming public, thereby making such a child seat alarm economically available to the buying public.

Even still another object of the present invention is to provide a new and improved child seat alarm for preventing a child from being left inside a motor vehicle once a door of the vehicle has been opened or its engine has been shut off.

Lastly, it is an object of the present invention to provide a new and improved child seat alarm including a car seat portion adapted for being positioned within a motor vehicle. The car seat portion includes child engagement straps. The child engagement straps include a male buckle and a corresponding female receptacle. The male buckle is lockably received within the female receptacle in a locked orientation. An alarm is disposed within the car seat portion. The alarm includes a pair of speakers for broadcasting an audible alarm. The alarm is in an activated orientation when the male buckle is lockably received within the female receptacle.

The alarm is in a deactivated orientation when the male buckle is removed from the female receptacle. The alarm is in communication with an electrical system of the vehicle whereby a shut down of the motor vehicle's engine or an opening of a driver's door will sound the alarm when the alarm is in the activated orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
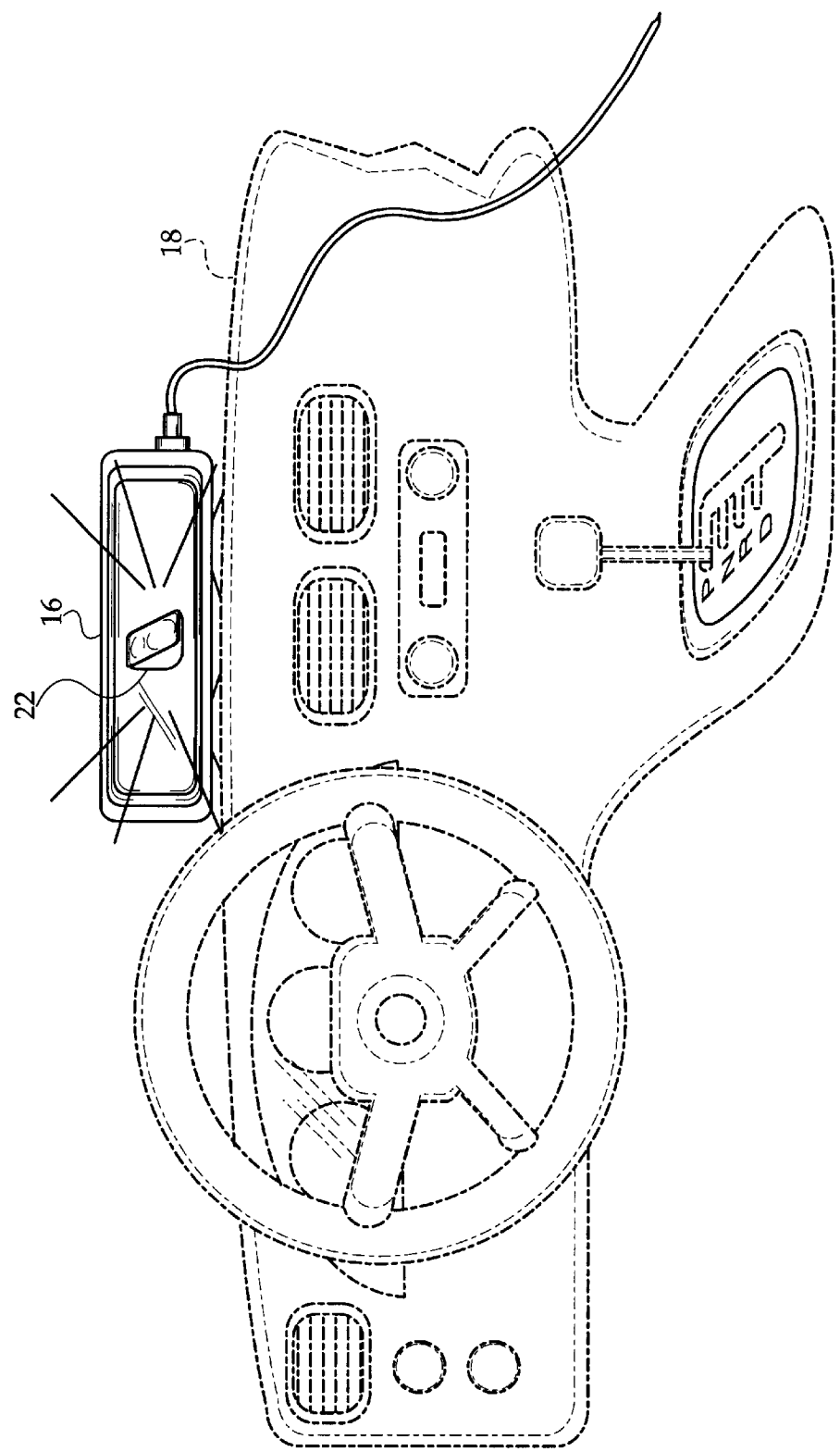
FIG. 1 is a perspective view of the preferred embodiment of the child seat alarm constructed in accordance with the principles of the present invention.
Figure 2:
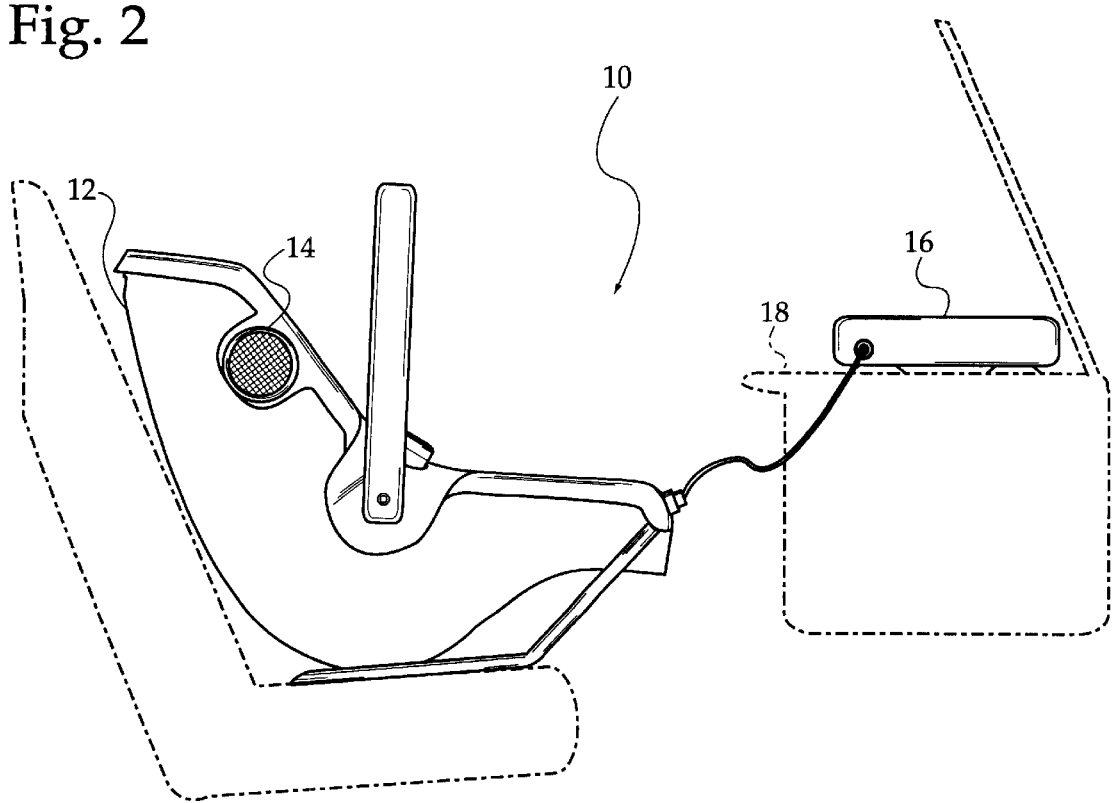
FIG. 2 is a side view of the present invention illustrated in place within a motor vehicle.
Figure 3:
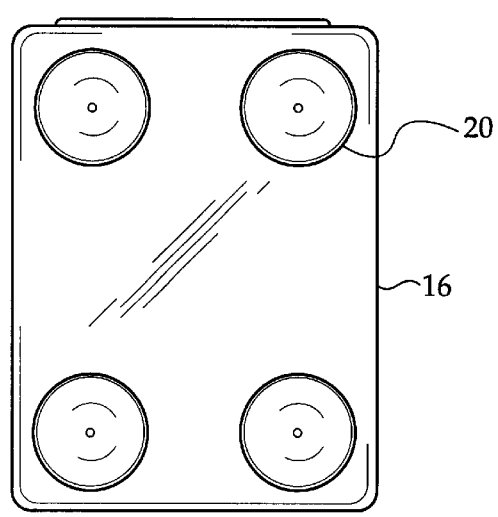
FIG. 3 is a bottom plan view of the display of the present invention.
Figure 4:
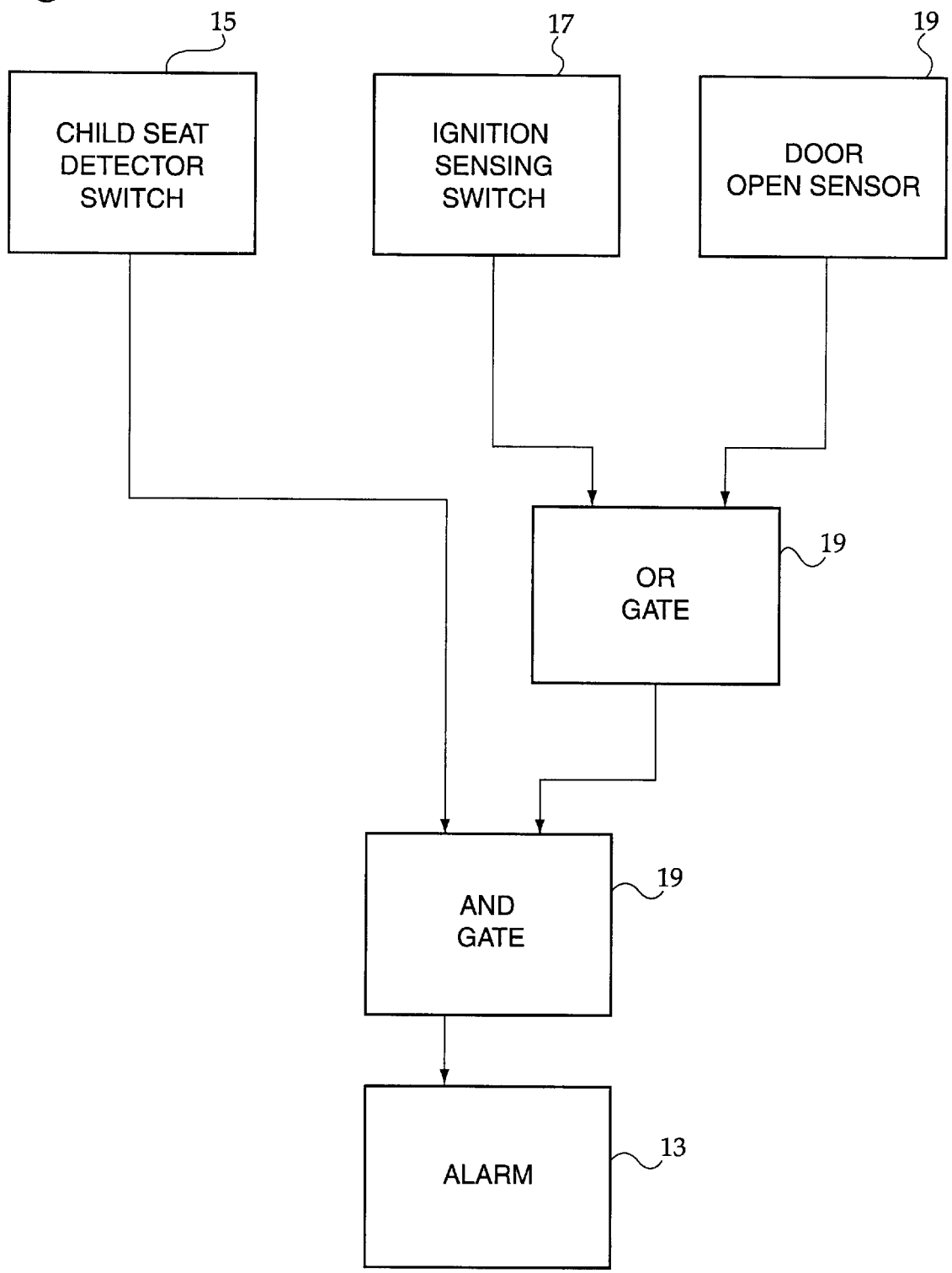
FIG. 4 is a schematic illustration of the operability of the present invention.

With reference now to the drawings, and in particular, to FIGS. 1 through 4 thereof, the preferred embodiment of the new and improved child seat alarm embodying the principles and concepts of the present invention and generally designated by the reference number 10 will be described.

Specifically, it will be noted in the various FIGURES that the device relates to a child seat alarm for preventing a child from being left inside a motor vehicle once a door of the vehicle has been opened or its engine has been shut off. In its broadest context, the device consists of a car seat portion, an alarm, and a display. Such components are individually configured and correlated with respect to each other so as to attain the desired objective.

The car seat portion 12 is adapted for being positioned within a motor vehicle. The car seat portion 12 is secured within the motor vehicle using known means. The car seat portion 12 includes child engagement straps. The child engagement straps include a male buckle and a corresponding female receptacle. The male buckle is lockably received within the female receptacle in a locked orientation.

The alarm 13 is disposed within the car seat portion 12. The alarm 13 includes a pair of speakers 14 for broadcasting an audible alarm. The alarm 13 is in an activated orientation when the male buckle is lockably received within the female receptacle. The alarm 13 is in a deactivated orientation when the male buckle is removed from the female receptacle. This will trigger a sensor 15 within the female receptacle. The alarm 13 is in communication with an electrical system of the vehicle whereby a shut down of the motor vehicle's engine or an opening of a driver's door will sound the alarm when the alarm is in the activated orientation. The engine is provided with a sensor 17 within the ignition that will trigger the alarm 13 upon the removal of the key from the ignition.

What is claimed as being new and desired to be protected by letters Patent of the United States is as follows:

1. A child seat alarm for preventing a child from being left inside a motor vehicle once a door of the vehicle has been opened or its engine has been shut off comprising, in combination:

a car seat portion adapted for being positioned within a motor vehicle, the car seat portion including child engagement straps, the child engagement straps including a male buckle and a corresponding female receptacle, the male buckle being lockably received within the female receptacle in a locked orientation;

an alarm disposed within the car seat portion, the alarm including a pair of speakers for broadcasting an audible alarm, the alarm being in an activated orientation when the male buckle is lockably received within the female receptacle, the alarm being in a deactivated orientation when the male buckle is removed from the female receptacle, the alarm being in communication with an electrical system of the vehicle whereby shut down of the motor vehicle's engine or an opening of a driver's door will sound the alarm when the alarm is in the activated orientation; and a display being adapted for mounting on a dashboard of the motor vehicle, the display being in communication with the alarm, the display including a plurality of suction cups disposed on a lower surface thereof to facilitate mounting to the dashboard.

2. A child seat alarm for preventing a child from being left inside a motor vehicle once a door of the vehicle has been opened or its engine has been shut off, the motor vehicle having a dashboard, comprising, in combination:

a car seat portion adapted for being positioned within a motor vehicle, the car seat portion including child engagement straps, the child engagement straps including a male buckle and a corresponding female receptacle, the male buckle being lockably received within the female receptacle in a locked orientation;

an alarm disposed within the car seat portion, the alarm including a pair of speakers for broadcasting an audible alarm, the alarm being in an activated orientation when the male buckle is lockably received within the female receptacle, the alarm being in a deactivated orientation when the male buckle is removed from the female receptacle, the alarm being in communication with an electrical system of the vehicle whereby shut down of the motor vehicle's engine or an opening of a driver's door will sound the alarm when the alarm is in the activated orientation; and a display adapted for mounting on the motor vehicle dashboard, the display being in communication with the alarm.

3. The child seat alarm as set forth in claim 2, wherein the display includes a plurality of suction cups disposed on a lower surface thereof to facilitate mounting to the dashboard.

* * * * *